Aug. 27, 1929. O. LUHR 1,725,875
AUTOMATIC REFRIGERATING LIQUID FEEDER AND REGULATOR
Filed May 22, 1926 2 Sheets-Sheet 1
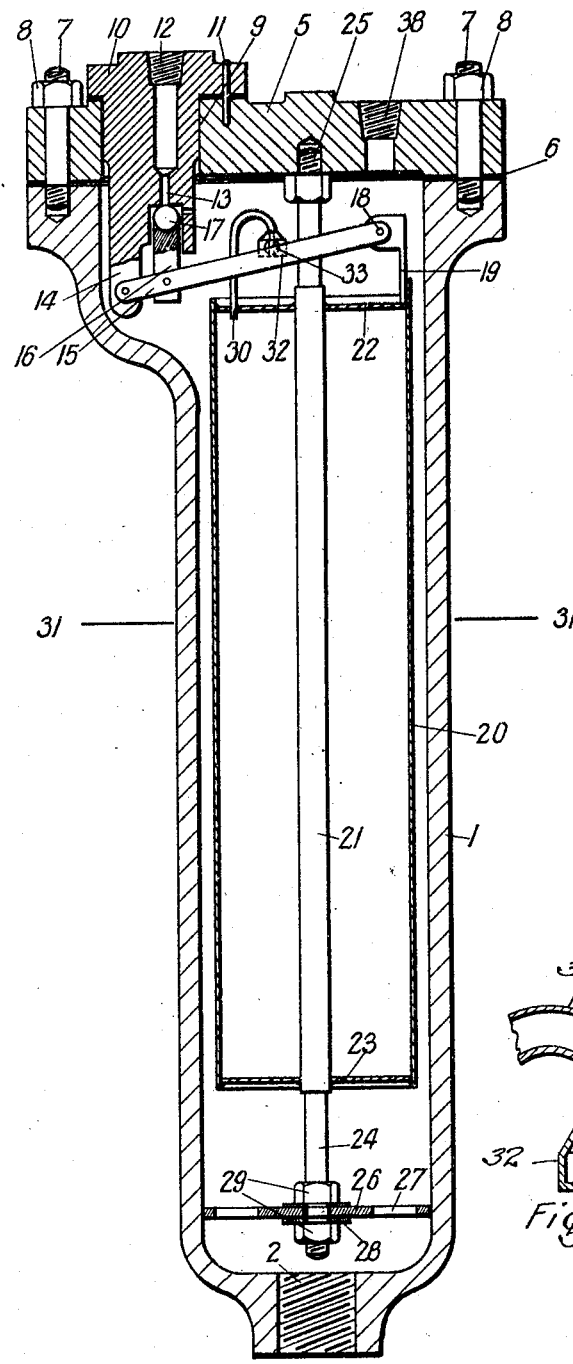

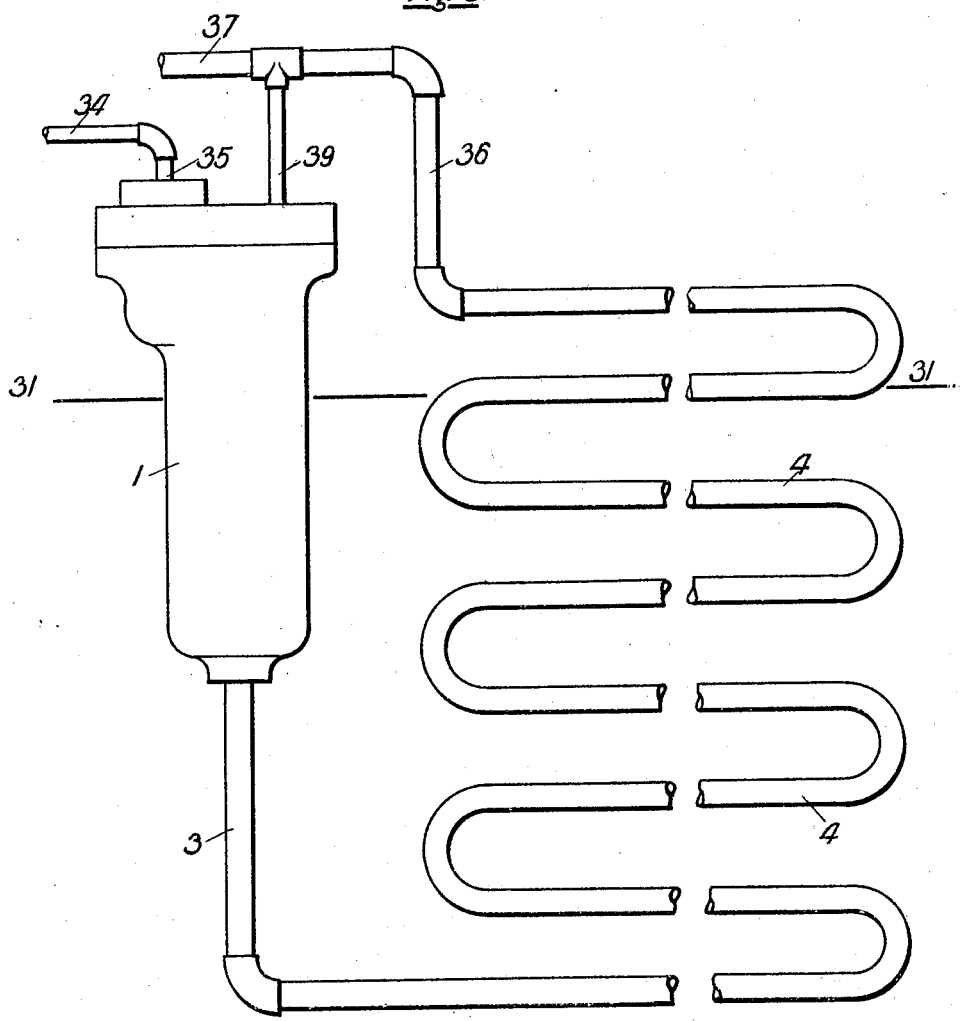

Patented Aug. 27, 1929.

1,725,875

UNITED STATES PATENT OFFICE.

OTTO LUHR, OF CHICAGO, ILLINOIS.

AUTOMATIC REFRIGERATING LIQUID FEEDER AND REGULATOR.

Application filed May 22, 1926. Serial No. 111,008.

The invention relates to apparatus for feeding liquids and regulating the feed thereof; more especially it relates to apparatus for feeding a refrigerating liquid and for regulating such feed.

Heretofore the regulating of the feed of refrigerating liquids has been effected commonly by means of hand operated valves. Such regulation is of course entirely depending on the human element and entails loss of time and unnecessary work.

It has also been proposed to regulated the feed of refrigerating liquid by means of an automatic pressure operated valve. This method however did not prove satisfactory, because it is not the pressure which is to be regulated, but the quantity of refrigerating liquid fed, independent of the pressure prevailing at that time. This pressure is not always the same, but changes according to the heat absorbed by the refrigerating medium, and that is the reason, why automatic pressure operated valves did not prove satisfactory.

It has also been attempted to regulate the flow or feed of refrigerating fluid by means of float operated valves, but the valves of this type, which have been known heretofore, had very many disadvantages. Only a few thereof shall be mentioned here.

The pressure prevailing in refrigerating devices changes frequently and may vary from 15 lbs. up to 250 lbs.

It is easy to understand, that the float has to be made pretty strong in order to stand up under the higher pressure. The walls of such float had to be made relatively thick and heavy, and in order to overcome this additional weight the diameter of the float had to be increased substantially to enable the float to operate by means of the necessary displacement. Thereby it has to be remembered, that ammonia, the fluid most commonly used for refrigerating purposes, has a specific gravity about 11% lighter than the specific gravity of water, so that a float having walls strong enough to withstand the heavy pressure mentioned above will have to be comparatively big to effect the necessary displacement, which in turn would demand a proportionally great casing. In very many cases however a restricted space only is to be had for the disposal of the regulating device, so that it would be impossible to use float operated valves.

The main object of the present invention is therefore, to provide an automatic refrigerating liquid feeder and regulator having a float operated valve, the float whereof is adapted to withstand any pressure which may arise in the feeding device without it being necessary, to increase the thickness of the walls of said float, i. e. without increasing unduly the weight of the float, so that the size of the apparatus may be kept as small as possible.

Another object of the invention is, to resist the pressure exerted upon the outside of the float by a counterpressure exerted upon the inner surfaces of the float.

A further object of the invention is to provide an automatic refrigerating liquid feeder and regulator having a float operated valve the float whereof is provided with means for equalizing the pressure exerted upon the inner and outer surfaces of the said float.

A still further object of the invention is to provide an automatic refrigerating liquid feeder and regulator having a float actuated valve, the float whereof is provided with means for permitting gasified refrigerating medium to enter the cavity in said float and for preventing at the same time the entrance of any fluid into said cavity.

A still further object of the invention is to provide an automatic refrigerating liquid feeder and regulator adapted to regulate the quantity of the liquid to be fed independently of the prevailing pressure.

Other objects of the invention not specifically mentioned will be easily understood from the following description.

The accompanying drawings illustrate embodiments of the present invention and one application thereof. It is however to be understood, that the invention is not to be limited to the embodiments and the application shown and described, but that such changes and alterations may be made that fall within the scope of the claim appended hereto without violating the spirit of this invention.

In the drawings:

Fig. 1 is a vertical section of the automatic refrigerating liquid feeder and regulator.

Fig. 2 is a detail showing an open basket and a cork ball therein as used in connection with the feeder and regulator of the present invention.

Fig. 3 is one application of the automatic refrigerating liquid feeder and regulator, a refrigerating coil being shown connected to said feeder and regulator.

An elongated casing 1 has at its lower end a tapped hole 2 adapted to receive a pipe 3 leading to a refrigerating coil 4. This construction shown in Fig. 3 would for inst. be used in cold storage rooms. It is however to be understood, that the invention is not to be limited to this specific construction, but that the feeding and regulating device forming the subject matter of the present invention may be used in connection with any suitable refrigerating device.

The upper end of the casing 1 is open, and a cover 5 is removably fastened to the casing to close said upper end. Between the cover 5 and the casing 1 a gasket 6 may be interposed to make the joint gas proof. The cover may for inst. be fastened to the casing by the bolts 7 and the nuts 8. The cover is provided with a hole 9 adapted to receive a valve body 10. Said body may have a drive fit with respect to the hole 9 and a dowel pin 11 serves to guide the body into the desired position.

A passage extends longitudinally of the valve body and throughout the whole length thereof. The upper end of said passage is tapped as shown by 12, while the intermediate portion 13 of said passage is of a decidedly smaller diameter. On the lower end of the valve body and substantially opposite of the dowel pin 11 is an extension 14 projecting downwardly. A lever 15 is pivotally fastened to said extension, and carries adjacent the extension of the valve body a plug 16, said plug being pivotally mounted on the lever. The lowest portion of the passage extending through the valve body is of a diameter or a size adapted to receive and guide said plug and to receive also a ball 17 resting on the top end of the plug. The top of said plug may be concaved to fit the ball resting thereon.

The other end of lever 15 is pivotally fastened at 18 to an arm 19 fastened to a float 20. Said float may be made of any suitable light sheet metal. A pipe 21 extends through the top and bottom plates 22 and 23 respectively of the float and may be soldered thereto or fastened thereto in any other suitable manner. A rod 24 extends through said pipe. The upper end of said rod is screwed into a tapped hole 25 in the cover 5, while the lower end of said rod extends through a plate 26 wedged or clamped in the casing 1 adjacent the bottom thereof. Said plate is provided with a plurality of holes 27, the purpose whereof will be explained later. The rod 24 extends through a center hole 28 in said plate, and nuts 29 hold the rod in the desired position relative to the plate.

A goose neck pipe 30 extends through the top plate 22 of the float 20 and is soldered therein or otherwise fastened thereto. It is to be noted that the different joints between the top and bottom plates 22 and 23 respectively and the guide pipe 21, and between the goose neck pipe and the top plate 22 must be made liquid proof, so that, in case the liquid should for one reason or another rise above the predetermined liquid level indicated at 31—31, the liquid will be prevented from entering the cavity of the float.

An open basket 32 is fastened to the end of the goose neck pointing downwardly, and a cork ball 33 is positioned in said basket.

A pipe 34 connects a liquid container (not shown) with the feeder and regulator by means of a connecting pipe 35 communicating with the tapped hole 12.

The upper portion of the refrigerating coil 4 is connected by means of a connecting pipe 36 with a gas outlet pipe 37 communicating with a refrigerating machine (not shown).

The cover 5 of the casing 1 is provided with an additional tapped hole, and a pipe 39 screwed into said hole communicates with the gas outlet pipe 37.

The invention operates as follows:

When the refrigerator plant is started, casing 1 is empty, and float 20 is located at its lowest position, i. e. the end of the guide pipe 21 rests upon the upper nut 29. When the float is in this position, the lever 15 is swung downwardly from the position shown in Fig. 1. Thereby the plug 16 is also moved downwardly permitting the ball 17 to follow. Hereby the passage is opened and refrigerating liquid can flow from the liquid container (not shown) through pipes 34 and 35 and through the passage into the casing 1, through the holes 27 in plate 26, tapped hole 2 and pipe 3 into the coil 4.

When the refrigerating liquid rises in the refrigerating coil and in the casing, the float will be lifted, and the lever 15 will swing upwardly, thereby lifting the plug 16 and the ball valve 17, until the latter closes the lower mouth of the passage, thereby interrupting the flow of the refrigerating liquid. When the valve is in closed position, i. e. in the position shown in Fig. 1, the liquid level is at line 31—31. Above this line the casing and the refrigerating coil will be filled with gas, i. e. with gasified refrigerating medium. This gasified refrigerating medium enters the casing through the pipe 39 and hole 38 in cover 5. By these means the pressure in the coil and in the casing is equalized. The same pressure prevails also in the inner portion of the float, because the gas will enter into the cavity in the float through the goose neck pipe 30. Seeing that the pressure surrounding the float is counterbalanced by the pressure in the float, it is not necessary to make the walls of the float especially heavy, but a very light metal may be used for the float.

Should for one reason or another the float operated valve not function correctly, and should in consequence thereof the liquid rise in the casing above the top of the float, it would still be impossible for any liquid to enter the hollow float, because the liquid rising in the casing will lift the cork ball 33 until it abuts and thereby closes the end of the goose neck pipe pointing downwardly.

What I claim as new and desire to secure by Letters Patent is:

In an automatic refrigerating liquid feeder and regulator, the combination of a casing, an outlet from said casing, an inlet valve mounted on said casing, a hollow float adapted to reciprocate in the casing and to operate the inlet valve according to the height of the liquid level in the casing, a goose neck pipe connecting the inside of the hollow float with the inside of the casing and forming an integral part of the float, the outside end of said goose neck pipe pointing downwardly, an open basket mounted on said end of the goose neck pipe, and a cork ball arranged in said basket and adapted to be lifted by a liquid rising in the casing and to close the outside end of the goose neck pipe.

In witness whereof I have signed hereunto my name.

OTTO LUHR.